(12) United States Patent
Lee et al.

(10) Patent No.: US 9,059,886 B1
(45) Date of Patent: Jun. 16, 2015

(54) METHOD FOR TRANSMITTING DATA USING VARIABLE GUARD INTERVAL AND APPARATUS THEREOF

(71) Applicant: Electronics and Telecommunications Research Institute, Daejeon (KR)

(72) Inventors: Jae-Ho Lee, Daejeon (KR); Sang-Jung Ra, Daejeon (KR); Dong Joon Choi, Daejeon (KR); Namho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/308,997

(22) Filed: Jun. 19, 2014

(30) Foreign Application Priority Data

Dec. 3, 2013 (KR) .................. 10-2013-0149474

(51) Int. Cl.
*H04L 27/26* (2006.01)
(52) U.S. Cl.
CPC ........ *H04L 27/2613* (2013.01); *H04L 27/2627* (2013.01)

(58) Field of Classification Search
CPC ............ H04L 27/2607; H04L 27/2601; H04L 27/2646; H04L 1/12; H04L 1/203; H04L 5/0007; H04L 27/2613; H04L 27/2627
USPC ........... 375/220, 227, 260, 340; 370/344, 480
See application file for complete search history.

(56) References Cited

U.S. PATENT DOCUMENTS

| | | | |
|---|---|---|---|
| 7,573,944 B2* | 8/2009 | Chang et al. .................. | 375/260 |
| 8,134,938 B2* | 3/2012 | Yi et al. .......................... | 370/255 |
| 8,265,179 B2* | 9/2012 | Okazaki ......................... | 375/260 |
| 8,416,865 B2* | 4/2013 | Zhang et al. .................. | 375/260 |
| 8,441,916 B2 | 5/2013 | Shin et al. | |
| 2007/0183309 A1* | 8/2007 | Nakamura ..................... | 370/208 |
| 2012/0057872 A1* | 3/2012 | Freda et al. .................... | 398/76 |

\* cited by examiner

*Primary Examiner* — Leon Flores
(74) *Attorney, Agent, or Firm* — William Park & Associates Ltd.

(57) ABSTRACT

In an orthogonal frequency division multiplexing (OFDM) wireless communication system, when path delay information is received from a reception apparatus through a return path after data transmission, a length of a cyclic prefix included in a transmitted signal is adjusted on the basis of a delay value included in the path delay information.

11 Claims, 8 Drawing Sheets

FIG. 3

| PARAMETER | FIRST MODE | SECOND MODE |
|---|---|---|
| CHANNEL BANDWIDTH | 8 MHz | 8 MHz |
| NUMBER OF CP SAMPLES, L | 32 | 64 |
| FFT duration, $T_{FFT}$ | 448 us | 448 us |
| CP duration, $T_{GI}$ | 3.5 us | 7 us |
| OFDM symbol duration, $T_S$ | 451.5 us | 455 us |
| NUMBER OF IFFTS, N | 4096 | 4096 |

| PILOT SYMBOL INTERVAL, $S_f$ | 48 | 96 |
|---|---|---|
| NUMBER OF PILOT SYMBOLS PER OFDM SYMBOL, $N_p$ | 84 | 42 |

METHOD FOR TRANSMITTING DATA USING VARIABLE GUARD INTERVAL AND APPARATUS THEREOF

CROSS-REFERENCE TO RELATED APPLICATION

This application claims priority to and the benefit of Korean Patent Application No. 10-2013-0149474 filed in the Korean Intellectual Property Office on Dec. 3, 2013, the entire contents of which are incorporated herein by reference.

BACKGROUND OF THE INVENTION (a) Field of the Invention

The present disclosure relates to a transmission and reception method and an apparatus thereof, and more particularly, to a method for transmitting and receiving data using a variable guard interval, and a transmission apparatus and a reception apparatus.

(b) Description of the Related Art

When high speed data is transmitted in a single carrier using a multi-path channel, the transmission data is severely distorted due to inter-symbol interference (ISI). To solve this problem, orthogonal frequency division multiplexing (OFDM), a multi-carrier scheme in which high speed data is changed into low speed data and transmitted by using several sub-carriers, has been spotlighted. With the OFDM scheme, limited frequency resources may be effectively utilized, a high data transfer rate may be provided, and ISI generated by a multi-path channel may be removed by using a cyclic prefix (CP) as a guard interval.

Various communication standards such as digital video broadcasting (DVB), wireless local area network (WLAN), and the like, use a variable CP. Also, tens of pilot symbols are inserted into every OFDM symbol to allow for simple channel estimation and compensation, relative to a single carrier.

In a system using OFDM, a CP inserted to remove ISI generated by a multi-path channel lowers a data rate and causes loss of transmission power by a length thereof. Thus, in order to enhance a data rate in a system using a variable CP, a short CP is required to be used. However, if a CP length is short, ISI is generated by a multi-path channel, increasing a bit error rate, which rather lowers a data rate.

In addition, in order to estimate and compensate a multi-path channel, a transmission apparatus inserts tens of pilot symbols into every OFDM symbol and transmits the same, and a reception apparatus estimates a channel of a subcarrier to which a pilot symbol has been allocated, and in case of a subcarrier to which a pilot symbol is not allocated, the reception apparatus estimates a channel by using interpolation using the estimated channel value of the subcarrier. In general, a channel may be more accurately estimated when there are a large number of pilot symbols than when there are less. Thus, in order to enhance performance of the reception apparatus, it would be desirable to allocate more pilot symbols; however, in this case, a data rate is reduced.

SUMMARY OF THE INVENTION

The present disclosure has been made in an effort to provide a transmission and reception method and an apparatus thereof having advantages of enhancing data transmission, while using a variable guard interval, in an orthogonal frequency division multiplexing (OFDM) multiplexing wireless communication system.

The present disclosure has also been made in an effort to provide a transmission and reception method and an apparatus thereof having advantages of enhancing a data rate by adjusting a number of pilot symbols.

An exemplary embodiment of the present disclosure provides a method for transmitting data in an orthogonal frequency division multiplexing (OFDM) wireless communication system, including: receiving path delay information from a reception apparatus through a return path, after data transmission; adjusting a length of a cyclic prefix (CP) included in a transmitted signal, on the basis of a delay value included in the path delay information; and performing data transmission using the CP having an adjusted length.

The adjusting of the length may include: comparing the delay value included in the path delay information with a pre-set delay value; and when the delay value included in the path delay information is smaller than the pre-set delay value, adjusting the length of the CP.

The adjusting of the length of the CP may include adjusting the length of the CP to be shorter than a length thereof used for previous data transmission.

The adjusting of the length of the CP may include adjusting the length of the CP to be the shortest among all the lengths available to be used for data transmission.

The delay value included in the path delay information may be a maximum delay spread value.

The method may further include: receiving error information through the return path; and when the error information is received, adjusting a number of pilot symbols used for data transmission.

The adjusting of the number of the pilot symbols may include adjusting the number of pilot symbols to be smaller than a number of symbols used for previous data transmission.

The adjusting of the number of pilot symbols may include adjusting the number of pilot symbols to be the smallest among all the number of pilot symbols available to be used for data transmission.

The adjusting of the number of the pilot symbols may include: obtaining a bit error rate (BER) from the error information; comparing the obtained BER with a pre-set BER; and when the obtained BER is lower than the pre-set BER, adjusting the number of pilot symbols.

Another exemplary embodiment of the present disclosure provides a method for transmitting data in an orthogonal frequency division multiplexing (OFDM) wireless communication system, including: inserting a first number of pilot symbols into every OFDM symbol corresponding to data intended to be transmitted, and transmitting the same; receiving error information from a reception apparatus through a return path; when the error information is received, adjusting the first number of pilot symbols to a second number of pilot symbols smaller than the first number of pilot symbols; and inserting the second number of pilot symbols into every OFDM symbol corresponding to data intended to be transmitted, and transmitting the same.

Yet another exemplary embodiment of the present disclosure provides a method for receiving data in an orthogonal frequency division multiplexing (OFDM) wireless communication system, including: receiving signals transmitted via multi-path channels; processing the received signals to calculate path delay information; and transmitting the calculated path delay information to a transmission apparatus through a return path.

The method may further include: decoding the reception signals to obtain data; calculating a bit error rate (BER) with respect to the obtained data; and transmitting error information including the BER to the transmission apparatus through the return path.

The transmitting of the error information to the transmission apparatus through the return path may include: comparing the calculated BER with a pre-set BER; and when the calculated BER is lower than the pre-set BER, transmitting the error information to the transmission apparatus through the return path.

Still another exemplary embodiment of the present disclosure provides an apparatus for transmitting data in an orthogonal frequency division multiplexing (OFDM) wireless communication system, including: a path delay information receiver configured to receive path delay information from a reception apparatus through a return path, after data transmission; a cyclic prefix (CP) adjusting processer configured to adjust a length of a CP included in a transmitted signal, on the basis of a delay value included in the path delay information; and a CP inserting processer configured to generate a CP on the basis of the adjusted length, and inserting the same into data transmitted thereafter.

When the delay value included in the path delay information is smaller than a pre-set delay value, the CP adjusting processer may adjust the CP length. The CP length adjusting processer may adjust the length of the CP to be the shortest among all the available lengths used for data transmission.

The apparatus may further include: an error information receiver configured to receive error information through the return path; and a symbol number adjusting processer configured to adjust a number of pilot symbols used for data transmission, when the error information is received. The symbol number adjusting processer may adjust the number of pilot symbols to be smaller than a number of symbols used for previous data transmission.

Still another exemplary embodiment of the present disclosure provides an apparatus for receiving data in an orthogonal frequency division multiplexing (OFDM) wireless communication system, including: a fast Fourier transform (FFT) unit configured to receive signals transmitted through multipath channels and perform FFT thereon; a path delay calculator configured to calculate path delay information including a maximum delay spread value on the basis of the signals output from the FFT unit; and a first return processer configured to transmit the calculated path delay information to a transmission apparatus through a return path. The apparatus may further include: a decoder configured to decode reception signals output from the FFT unit to obtain data; a bit error rate (BER) calculator configured to calculate a BER with respect to the obtained data; and a second return processer configured to transmit error information including the BER to the transmission apparatus through the return path.

When the calculated BER is lower than a pre-set BER, the second return processer may transmit the error information to the transmission apparatus.

BRIEF DESCRIPTION OF THE DRAWINGS

FIG. 3 is a view illustrating a table of system parameters according to an exemplary embodiment of the present disclosure.

DETAILED DESCRIPTION OF THE EXEMPLARY EMBODIMENTS

Figure 1:
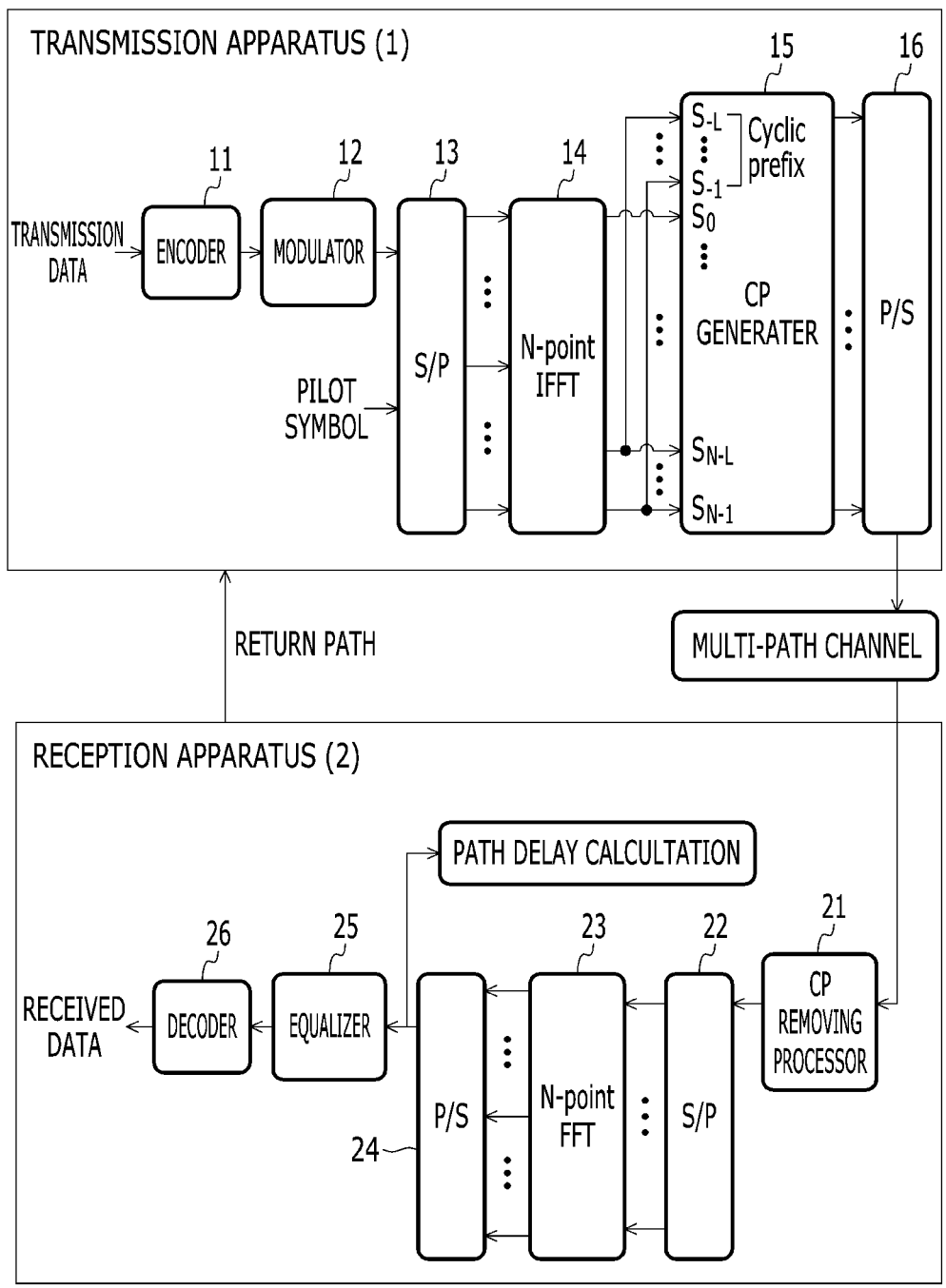
FIG. 1 is a view schematically illustrating a structure of a transmission/reception apparatus in an orthogonal frequency division multiplexing (OFDM) system according to an exemplary embodiment of the present disclosure.

In the following detailed description, only certain exemplary embodiments of the present disclosure have been shown and described, simply by way of illustration. As those skilled in the art would realize, the described exemplary embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a data transmission/reception method and an apparatus thereof according to exemplary embodiments of the present disclosure will be described in detail.

FIG. 1 is a view schematically illustrating a structure of a transmission/reception apparatus in an orthogonal frequency division multiplexing (OFDM) system according to an exemplary embodiment of the present disclosure.

As illustrated in FIG. 1, in the OFDM system, a transmission apparatus 1 includes an encoder 11, a modulator 12, a first signal converter 13, an inverse fast Fourier transform (IFFT) unit 14, a cyclic prefix (CP) generater 15, and a second signal converter 16.

The encoder 11 encodes data to be transmitted, and the modulator 12 modulates the data to be transmitted to generate OFDM symbols. For example, quadrature amplitude modulation (QAM) is performed on bits of the transmission data.

The first signal converter 13 converts a signal including OFDM symbols into a parallel signal and outputs the same. The first signal converter 13 may also be referred to as a serial/parallel (S/P) converter.

The IFFT unit 14 performs IFFT on the parallel signal including OFDM symbols to generate a signal of a time domain.

The CP generater 15 generates a CP and inserts the generated CP into the signal of a time domain.

The second signal converter 16 converts the CP-inserted signal into a serial signal and outputs the same. The second signal converter 16 may also be referred to as a parallel/serial (P/S) converter.

In this manner, the signal output from the second signal converter 16 is processed into a radio frequency (RF) signal and subsequently transmitted.

Meanwhile, a reception apparatus 2 includes a CP removing processor 21, a first signal converter 22, an FFT unit 23, a second signal converter 24, an equalizer 25, and a decoder 26.

The CP removing processor 21 removes the CP from the reception signal. Also, the signal transmitted from the transmission apparatus 1 may be received, converted into a baseband signal, processed into a digital signal, and output. Thereafter, the CP may be removed from the corresponding signal.

The first signal converter 22 converts the CP-removed reception signal into a parallel signal and outputs the same. The first signal converter 22 may also be referred to as an S/P converter.

The FFT unit 23 performs FFT on the input reception signal and outputs a signal of a frequency domain.

The second signal converter 24 converts the FFT-transformed signal of a frequency domain into a serial signal and outputs the same. The second signal converter 24 may also be referred to as a P/S converter.

The equalizer 25 may perform channel equalization on the basis of a channel estimate value with respect to the reception signal to compensate a channel.

The decoder 26 decodes data from the channel-compensated signal.

As for the transmission apparatus 1 and the reception apparatus 2 having the structures as described above, the transmission apparatus 1 inserts tens of pilot symbols into every OFDM symbol and transmits the same, and the reception apparatus 2 estimates a channel of a corresponding subcarrier on the basis of a pilot symbol, and in case of a subcarrier to which a pilot symbol was not allocated, the reception apparatus 2 estimates a channel by using interpolation using the estimated channel value of the subcarrier. The reception apparatus 2 performs channel compensation using the estimated channel value.

The transmission apparatus 1 also generates a cyclic prefix for reducing inter-symbol interference of the OFDM symbols.

Figure 2:
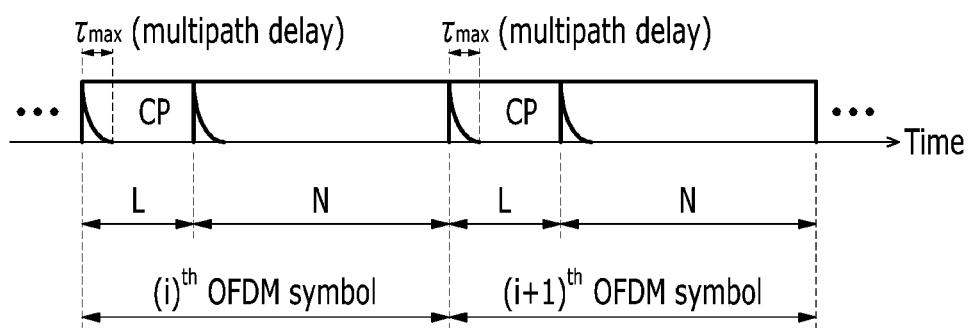
FIG. 2 is a view illustrating inserting of cyclic prefixes (CP) in the OFDM system according to an exemplary embodiment of the present disclosure.

FIG. 2 is a view illustrating inserting of cyclic prefixes (CP) in the OFDM system according to an exemplary embodiment of the present disclosure.

As illustrated in FIG. 2, the cyclic prefix generator 15 inserts guard intervals, i.e., cyclic prefixes, in front of OFDM symbols. The cyclic prefixes may be duplicates of predetermined (L) number of samples in rear portions of the OFDM symbols. Here, in general, the L number may be set such that each guard interval is longer than a maximum delay spread ($t_{max}$) of the multi-path channel.

There are two modes with respect to a length of cyclic prefixes.

FIG. 3 is a view illustrating a table of system parameters according to an exemplary embodiment of the present disclosure.

As illustrated in FIG. 3, different system parameters may be used in two types of modes, that is, first and second modes. Here, system parameters used in a digital video broadcasting for cable 2 (DVB-C2) standard are taken as examples, and the present disclosure is not limited thereto.

It can be seen that a CP length of the first mode and that of the second mode are different, and a data rate loss rate $D_L$ according to a CP length is as follows.

$$D_L = \frac{T_{GI}}{T_S} = \frac{T_{GI}}{T_{FFF} + T_{GI}} \quad \text{(Equation 1)}$$

Here, $T_{GI}$ indicates a CP duration, $T_s$ indicates an OFDM symbol duration, and $T_{FFF}$ indicates an FFT duration. L indicates a number of CP samples. The number of CP samples corresponds to a CP length.

Based on Equation 1, when CP lengths are 32 samples and 64 samples, data rate loss rates DL may be calculated to be 0.77% and 1.54%, respectively. It can be seen that as the CP length is increased, the data rate loss rate is increased.

Thus, in the exemplary embodiment of the present disclosure, the reception apparatus calculates path delay information and transmits the calculated path delay information to the reception apparatus, so that the transmission apparatus may adjust a CP length, thus preventing degradation of a data rate.

To this end, as illustrated in FIG. 1, the reception apparatus 2 according to the exemplary embodiment of the present disclosure calculates a path delay on the basis of a reception signal and transmits path delay information to the transmission apparatus 1 through a return path. Here, the reception apparatus 2 may calculate a maximum delay spread ($t_{max}$), include the calculated maximum delay spread ($t_{max}$) in the path delay information, and transmit the same.

The transmission apparatus 1 may adjust a CP length on the basis of the received path delay information. For example, when a path delay, that is, $t_{max}$, provided from the reception apparatus 2 through the return path, has a maximum value, e.g., 2 us, the transmission apparatus 1 may adjust the CP length to have 32 samples having a shorter length among the lengths of the two types of mode. In this manner, the data rate may be improved by minimizing a data rate loss rate $D_L$, while avoiding ISI due to a multi-path channel.

Also, the transmission apparatus 1 adjusts a number of pilot symbols to enhance the data rate.

Figures 4, 5:
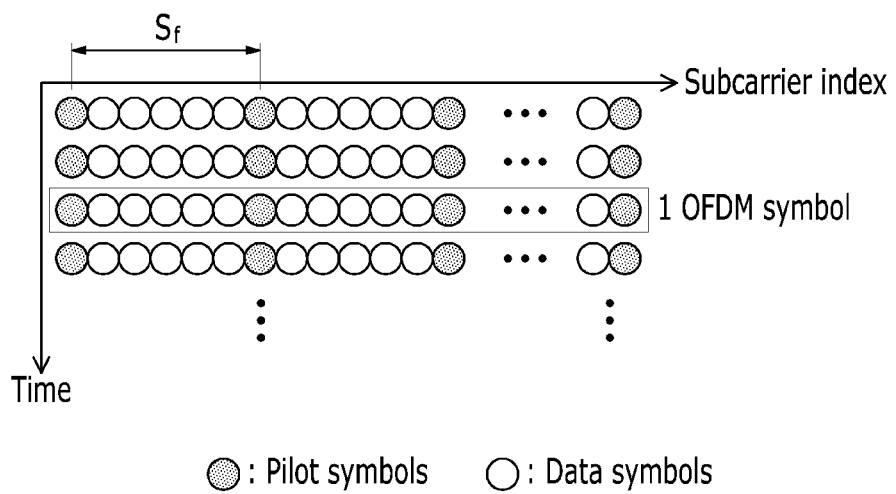
FIG. 4 is a view illustrating pilot symbols inserted into OFDM symbols according to an exemplary embodiment of the present disclosure.
FIG. 5 is a view illustrating parameters related to the number of pilot symbols according to an exemplary embodiment of the present disclosure.

FIG. 4 is a view illustrating pilot symbols inserted into OFDM symbols according to an exemplary embodiment of the present disclosure.

As illustrated in FIG. 4, for channel estimation and compensation, pilot symbols are inserted in every OFDM symbol, and in this case, the pilot symbols are inserted at every pilot symbol interval $S_f$. When pilot symbols instead of data symbols are transmitted, the data rate is much reduced. The data rate loss rate $D_L$ according to pilot symbols may be expressed as follows.

$$D_L = \frac{N_P}{N} \quad \text{(Equation 2)}$$

Here, N indicates a size of IFFT, and $N_p$ indicates a number of pilot symbols inserted per OFDM symbol The number of pilot symbols may vary according to a mode.

FIG. 5 is a view illustrating parameters related to the number of pilot symbols according to an exemplary embodiment of the present disclosure. In FIG. 5, system parameters used in DVB-C2 standard are taken as an example, and the present disclosure is not limited thereto.

As illustrated in FIG. 5, when a pilot symbol interval $S_f$ is 48, one pilot symbol is inserted for every 48 subcarriers, and in this case, the number of pilot symbols is 84. When a pilot symbol interval $S_f$ is 96, one pilot symbol is inserted for every 96 subcarriers, and in this case, the number of pilot symbols is 42.

On the basis of Equation 2, when the numbers of pilot symbols are 84 and 42, data rate loss rates $D_L$ are calculated as 2.05% and 1.025%, respectively. That is, as the pilot symbol interval $S_f$ is shorter, the data rate loss rate $D_L$ is increased, and accordingly, the data rate is reduced.

In general, as the pilot symbol interval Sf is shorter, the number of inserted pilot symbols is increased. Thus, a smaller amount of errors are generated in channel estimation, reducing the bit error rate (BER) of the reception apparatus. Meanwhile, as the pilot symbol interval Sf is longer, the number of inserted pilot symbols is reduced. Thus, a larger amount of errors are generated in channel estimation, increasing the BER of the reception apparatus. Thus, in order to reduce the BER of the reception apparatus, a larger amount of pilot symbols is required, and it can be recognized that the BER indicating performance of the reception apparatus and a data rate are traded off. That is, when the number of pilot symbols is increased to increase the BER, the data rate is relatively reduced, and when the number of pilot symbols is reduced to increase the data rate, the BER is relatively reduced.

In the exemplary embodiment of the present disclosure, in order to enhance the data rate in consideration of the trade-off characteristics between a BER and the data rate, the transmission apparatus 1 adjusts the number of pilot symbols on the basis of the BER measured by the reception apparatus 2. To this end, the reception apparatus 2 calculates a BER on the basis of a reception signal, and transmits the calculated BER to the transmission apparatus 1 through a return path. The transmission apparatus 1 adjusts the number of pilot symbols to an appropriate number on the basis of the BER received through the return path. For example, in a case in which a BER permitted in the reception apparatus is equal to or less than $10^{-6}$, when a BER calculated from a reception signal is lower than the pre-set BER, e.g., when it is $10^{-7}$, the reception apparatus transmits information including the calculated BER to the transmission apparatus through the return path. Accordingly, the transmission apparatus determines that the BER does not satisfy the permitted pre-set BER, and adjusts the number of pilot symbols inserted into OFDM symbols such that it is reduced. Therefore, the data rate may be enhanced by minimizing the data rate loss rate DL, while increasing the BER of the reception apparatus to a level that meets a requested BER.

In order to enhance the data rate, the reception apparatus 2 may further include elements as follows.

Figure 6:
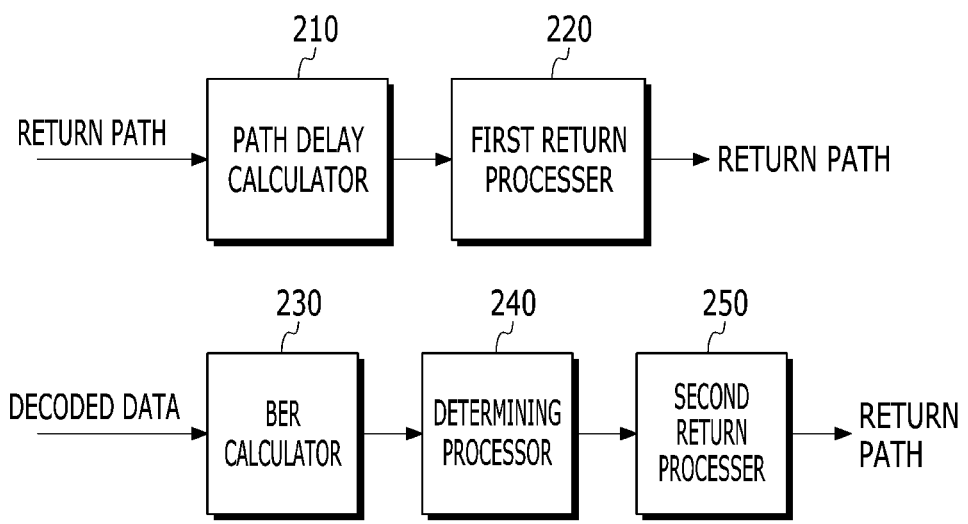
FIG. 6 is a view illustrating additional elements for enhancing a data rate of a reception apparatus according to an exemplary embodiment of the present disclosure.

FIG. 6 is a view illustrating additional elements for enhancing a data rate of a reception apparatus according to an exemplary embodiment of the present disclosure.

As illustrated in FIG. 6, the reception apparatus 2 include a delay calculator 210 that calculates a path delay value from a reception signal, a first return processer 220 that transmits path delay information including the path delay value, a BER calculator 230 that calculates a BER on the basis of a signal decoded from the reception signal, a determining processer 240 that determines whether to inform about the calculated BER, and a second return processer 250 that transmits error information including the BER calculated according to determination of the determining processer 240 through a return path.

The path delay calculator 210 calculates a path delay value with respect to a signal received through a multi-path on the basis of a signal output through the second signal converter 24 of the reception apparatus 2. In particular, the path delay calculator 210 calculates a maximum delay spread $t_{max}$ on the basis of signals by respective paths.

The BER calculator 230 calculates a BER on the basis of decoded data output from the decoder 26. The determining processer 240 compares the calculated BER with a pre-set BER allowable in the reception apparatus, and when the calculated BER is greater than the pre-set BER, the determining processer 240 determines to provide corresponding information to the transmission apparatus.

The transmission apparatus 1 that receives the information through the return path from the reception device 2 and processes the same may further include elements as follows.

Figure 7:
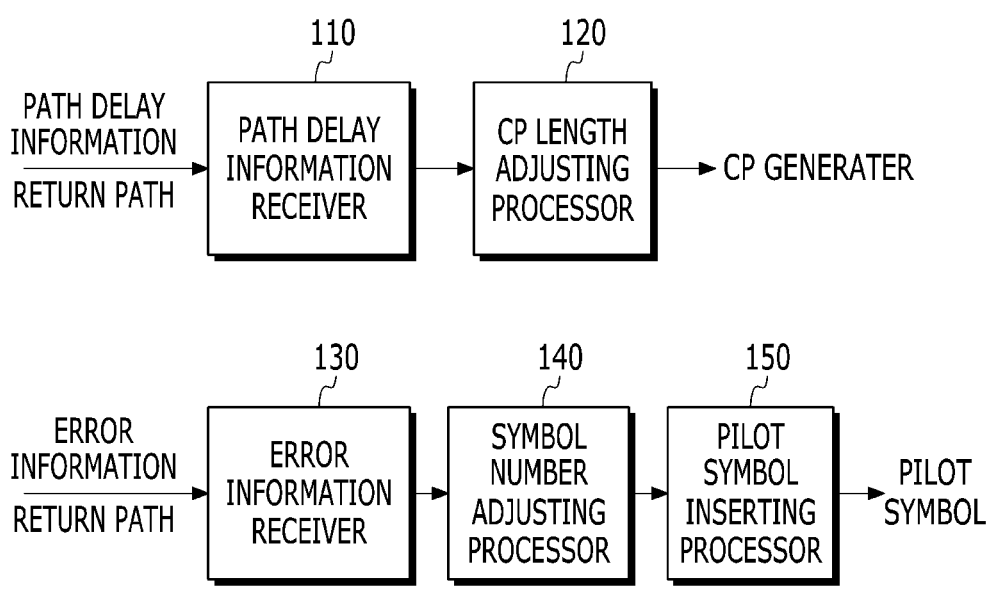
FIG. 7 is a view illustrating additional elements for processing information received through a return path in a transmission apparatus according to an exemplary embodiment of the present disclosure.

FIG. 7 is a view illustrating additional elements for processing information received through a return path, in a transmission apparatus according to an exemplary embodiment of the present disclosure.

As illustrated in FIG. 7, the transmission apparatus 1 includes a path delay information receiver 110 that receives path delay information transmitted through the return path, a CP length adjusting processer 120 that draws a delay value (e.g., a maximum delay spread $t_{max}$ value) from the path delay information and sets a CP length on the basis of the delay value, an error information receiver 130 that receives error information transmitted through the return path, a symbol number adjusting processer 140 that draws a BER from the error information and sets the number of pilot symbols on the basis of the BER, and a pilot symbol inserting processer 150 that inserts a pilot symbol into an OFDM symbol.

The CP length adjusting processer 120 compares the delay value, e.g., the maximum delay spread value transmitted from the reception apparatus 2 with a pre-set delay value, and when the delay value is smaller than the pre-set delay value, the CP length adjusting processer 120 selects a CP length shorter than a CP length which was selected in a previous transmission, from among available CP lengths. In a case in which different CP lengths are set for the two types of mode as mentioned above, the CP length adjusting processer 120 selects a shorter length. In a case in which three or more lengths exist, the CP length adjusting processer 120 may select the shortest length or a length shorter than that selected in a previous transmission.

The CP length adjusting processer 120 provides information regarding the selected length to the CP generater 15 such that a CP having the corresponding length may be generated for data transmission.

Meanwhile, the symbol number adjusting processer 140 draws the BER from the error information received through the return path, and sets the number of pilot symbols on the basis of the BER. The pilot symbol inserting processer 150 inserts pilot symbols equal to the number of symbols set in every transmitted OFDM symbol on the basis of the set symbol number. The pilot symbol inserting processer 150 may generate pilot symbol signals with respect to the OFDM symbols output from the modulator 12 and provide the same to the IFFT unit 14 such that the pilot symbol signals may be disposed in corresponding positions in the OFDM symbols. In this case, as illustrated in FIG. 1, the pilot symbol signals may be converted into parallel signals through the first signal converter 13 and subsequently input to the IFFT unit 14 so as to be inserted into the OFDM symbols.

Hereinafter, a method for transmitting and receiving data according to an exemplary embodiment of the present disclosure will be described.

Figure 8:
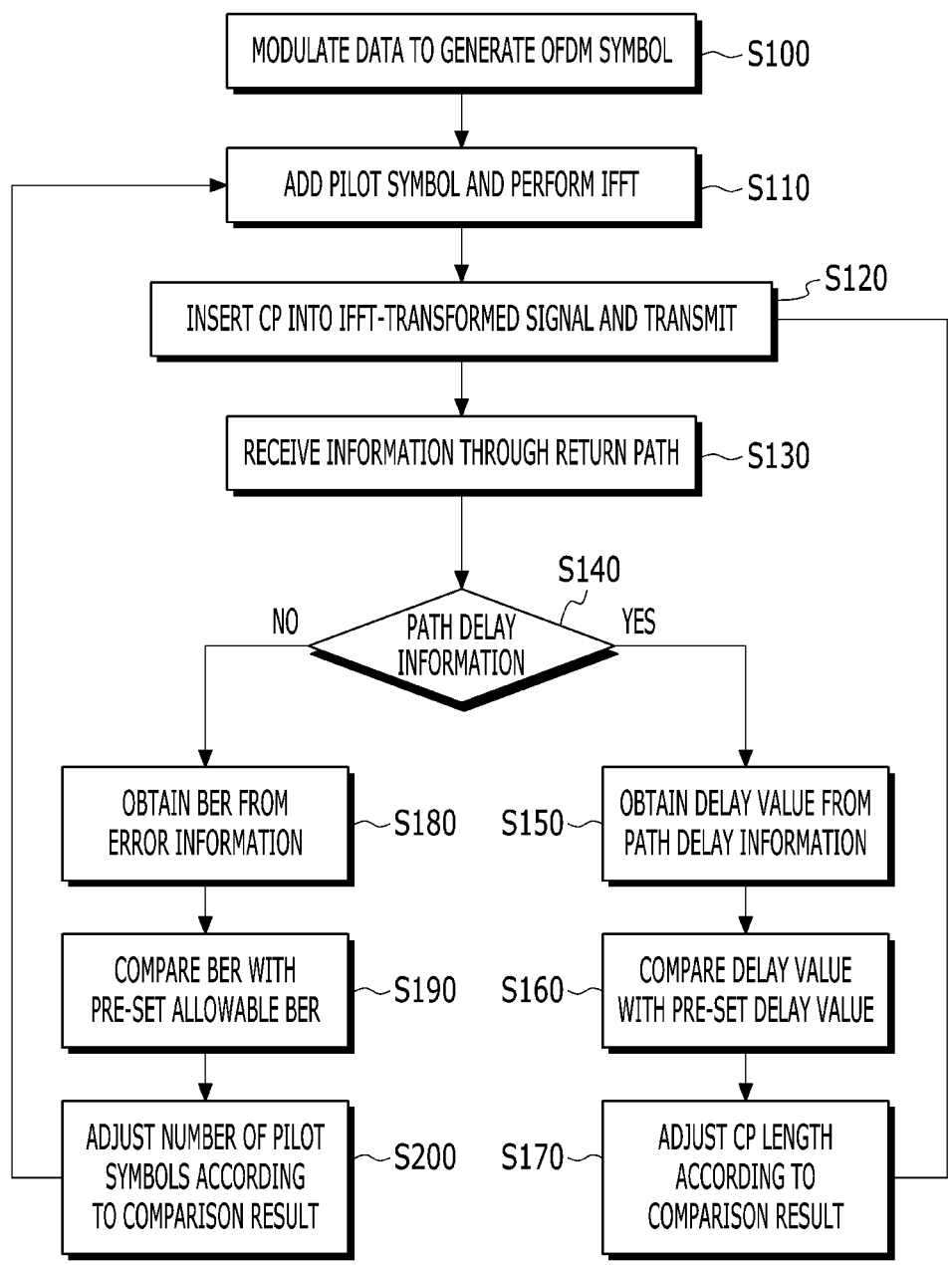
FIG. 8 is a flowchart illustrating a data transmission method according to an exemplary embodiment of the present disclosure.

FIG. 8 is a flowchart illustrating a data transmission method according to an exemplary embodiment of the present disclosure.

As illustrated in FIG. 8, the transmission apparatus 1 encodes data to be transmitted, modulates the coded data to generate an OFDM symbol, and performs IFFT on the OFDM symbol signal, while inserting a predetermined number of pilot symbols into the OFDM symbol, to convert the OFDM symbol signal into a signal of a time domain (S100 and S110).

Thereafter, the transmission apparatus 1 inserts a CP having a certain length into the IFFT-transformed signal, processes the corresponding signal into a transmission-available signal, and transmits the same (S120 and S130).

Thereafter, when predetermined information is received from the reception apparatus 2 through the return path (S140) and the received information is path delay information, the transmission apparatus 1 obtains a delay value (e.g., a maximum delay spread $t_{max}$ from the path delay information (S150). The transmission apparatus 1 compares the obtained delay value with a pre-set delay value, and when the obtained delay value is smaller than the pre-set delay value, the transmission apparatus 1 adjusts a CP length (S160 and S170). For example, when the obtained delay value is smaller than the pre-set delay value, the transmission apparatus 1 changes the CP length into a shorter length than a CP length which was used in previously data transmission or changes the CP length into the shortest one among available lengths. Thereafter, the transmission apparatus 1 inserts the changed CP length into a signal desired to transmit a CP in subsequent data transmission.

Meanwhile, in a case in which the information received through the return path is error information, the transmission apparatus 1 obtains a BER from the received error information (S180) and compares the obtained BER with a pre-set allowable BER. When the obtained BER is lower than the pre-set allowable BER, the transmission apparatus 1 adjusts the number of pilot symbols inserted into the OFDM symbol such that it is reduced to be smaller than the present number of pilot symbols (S190 and S200). For example, the transmission apparatus 1 changes the number of pilot symbols inserted into the OFDM symbol such that it is smaller than the number of symbols used for previous data transmission. Thereafter, in case of subsequent data transmission, the transmission apparatus 1 inserts the pilot symbols corresponding to the changed number of symbols into the OFDM symbol and transmits the same.

When the received information is error information, the transmission apparatus 1 may adjust the number of pilot symbols to be inserted into the OFDM symbol such that it is reduced to be smaller than the present number of symbols, according to the received error information.

Figure 9:
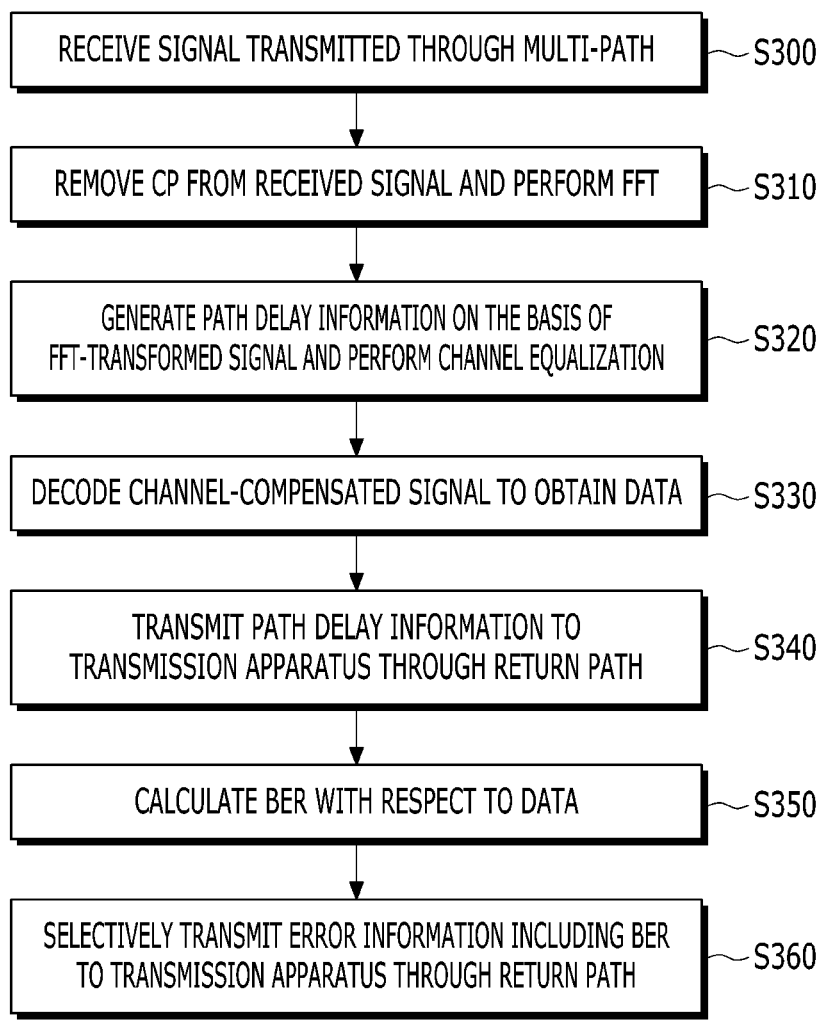
FIG. 9 is a flowchart illustrating a data reception method according to an exemplary embodiment of the present disclosure.

FIG. 9 is a flowchart illustrating a data reception method according to an exemplary embodiment of the present disclosure.

As illustrated in FIG. 9, the reception apparatus 2 receives a signal transmitted through a multi-path, removes a CP from the received signal, performs FFT on the CP-removed signal, and outputs a signal of a frequency domain (S300 and S310). The reception apparatus 2 performs channel equalization on the basis of a channel estimate value with respect to the FFT-transformed signal to compensate for a channel thereof. Also, the reception apparatus 2 calculates a delay value (e.g., a maximum delay spread $t_{max}$ on the basis of the FFT-transformed signal (S320). Thereafter, the reception apparatus 2 decodes the channel-compensated signal to obtain data (S330).

In particular, the reception apparatus 2 transmits path delay information including the calculated delay value to the transmission apparatus 1 through the return path in order to enhance the data rate (S340).

The reception apparatus 2 calculates a BER with respect to the obtained data in consideration of tradeoff between a data rate and the BER (S350), and transmits error information including the calculated BER to the transmission apparatus 1 through the return path. In this case, the reception apparatus 2 compares the calculated BER with a pre-set allowable BER, and when the calculated BER is lower than the pre-set BER, the reception apparatus 2 may transmit error information including the calculated BER through the return path (S350).

Thereafter, the transmission apparatus 1 adjusts the CP length according to the path delay information transmitted through the return path, and adjusts the number of pilot symbols to be inserted into the OFDM symbol according to the error information to thus enhance the data rate.

According to exemplary embodiments of the present disclosure, in an OFDM wireless communication system, by informing a transmission apparatus about a channel delay value obtained from a reception signal, inter-symbol interference (ISI) generated by a multi-path channel may be avoided, and since the shortest cyclic prefix (CP) among several CPs is used, data transmission may be maximized.

Since a reception apparatus informs a transmission apparatus about a bit error rate (BER) calculated over a received signal, the transmission apparatus may adjust the number of pilot symbols on the basis of the BER, thus enhancing a data rate.

Therefore, the transmission apparatus may enhance the data rate while minimizing the BER due to a channel by using an optimal system parameter for data transmission on the basis of information provided from the reception apparatus.

The exemplary embodiments of the present disclosure may not necessarily be implemented only through the foregoing apparatuses and methods, but may also be implemented through a program for realizing functions corresponding to the configurations of the exemplary embodiments of the present disclosure, a recording medium including the program, or the like.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for transmitting data in an orthogonal frequency division multiplexing (OFDM) wireless communication system, the method comprising: receiving path delay information from a reception apparatus through a return path, after data transmission; adjusting a length of a cyclic prefix (CP) based on a delay value included in the path delay information; receiving error information from the reception apparatus through the return path; obtaining a bit error rate (BER) from the error information; comparing the obtained BER with a pre-set BER; adjusting a number of pilot symbols when the obtained BER is lower than the pre-set BER; and performing data transmission using the CP having the adjusted length and the adjusted number of pilot symbols.

2. The method of claim 1, wherein
the adjusting of the length comprises;
comparing the delay value included in the path delay information with a pre-set delay value; and
when the delay value included in the path delay information is smaller than the pre-set delay value, adjusting the length of the CP.

3. The method of claim 2, wherein
the adjusting of the length of the CP comprises
adjusting the length of the CP to be shorter than a length thereof used for previous data transmission.

4. The method of claim 2, wherein
the adjusting of the length of the CP comprises adjusting the length of the CP to be the shortest among all the lengths available to be used for data transmission.

5. The method of claim 2, wherein the delay value included in the path delay information is a maximum delay spread value.

6. The method of claim 1, wherein the adjusting of the number of the pilot symbols comprises adjusting the number of pilot symbols to be smaller than a number of symbols used for previous data transmission.

7. The method of claim 1, wherein the adjusting of the number of pilot symbols comprises adjusting the number of pilot symbols to be the smallest among all the number of pilot symbols available to be used for data transmission.

8. An apparatus for transmitting data in an orthogonal frequency division multiplexing (OFDM) wireless communication system, the apparatus comprising: a path delay information receiver configured to receive path delay information from a reception apparatus through a return path, after data transmission; a cyclic prefix (CP) adjusting processor configured to adjust a length of a CP based on a delay value included in the path delay information; a CP inserting processor configured to insert the CP having the adjusted length into a data transmission; an error information receiver configured to receive error information from the reception apparatus through the return path; a symbol number adjusting processor configured to adjust a number of pilot symbols based on a bit error rate (BER) obtained from the error information, to compare the obtained BER with a pre-set BET, and to adjust a number of pilot symbols when the obtained BER is lower than the pre-set BER; and a pilot symbol inserting processor configured to insert the adjusted number of pilot symbols into the data transmission.

9. The apparatus of claim 8, wherein when the delay value included in the path delay information is smaller than a pre-set delay value, the CP adjusting processor adjusts the CP length.

10. The apparatus of claim 8, wherein the CP length adjusting processor adjusts the length of the CP to be the shortest among all the available lengths used for data transmission.

11. The apparatus of claim 8, wherein the symbol number adjusting processor adjusts the number of pilot symbols to be smaller than a number of symbols used for previous data transmission.

\* \* \* \* \*